United States Patent
Su et al.

(10) Patent No.: US 12,455,949 B2
(45) Date of Patent: Oct. 28, 2025

(54) ENHANCED SEQUENTIAL BIOMETRIC VERIFICATION

(71) Applicant: RESIDEO LLC, Golden Valley, MN (US)

(72) Inventors: Maoding Su, Shanghai (CN); Yanqing Yang, Shanghai (CN); Yekun Gao, Shanghai (CN)

(73) Assignee: RESIDEO LLC, Golden Valley, MN (US)

( * ) Notice: Subject to any disclaimer, the term of this patent is extended or adjusted under 35 U.S.C. 154(b) by 195 days.

(21) Appl. No.: 18/262,081

(22) PCT Filed: Jan. 22, 2021

(86) PCT No.: PCT/CN2021/073184
§ 371 (c)(1),
(2) Date: Jul. 19, 2023

(87) PCT Pub. No.: WO2022/155868
PCT Pub. Date: Jul. 28, 2022

(65) Prior Publication Data
US 2024/0303308 A1 Sep. 12, 2024

(51) Int. Cl.
*G06F 21/32* (2013.01)
(52) U.S. Cl.
CPC .................................. *G06F 21/32* (2013.01)
(58) Field of Classification Search
CPC .................................................. G06F 21/32
See application file for complete search history.

(56) References Cited

U.S. PATENT DOCUMENTS

| 4,532,507 A | 7/1985 | Edson et al. |
| 4,532,783 A | 8/1985 | Maurice |

(Continued)

FOREIGN PATENT DOCUMENTS

| CA | 2247600 C | 3/2002 |
| CN | 1086284 C | 6/2002 |

(Continued)

OTHER PUBLICATIONS

Bristol "On a New Measure of Interaction for Multivariable Process Control," IEEE Transactions on Automatic Control, vol. AC-11, No. 1, pp. 133-134, Jan. 1966.

(Continued)

*Primary Examiner* — Jimmy H Tran
(74) *Attorney, Agent, or Firm* — Greenberg Traurig, LLP; David J. Dykeman; Nicholas Martin

(57) ABSTRACT

This disclosure is directed to a sequential biometric verification system and process. A device receives (502) a first biometric input and determines a match with a first predetermined biometric input of a verification sequence. The device provides (504) a first prompt that includes a request for a next biometric input user selection or a complete verification sequence user selection. The device receives the next biometric input user selection in response to the first prompt and a second biometric input, and then determines a match with a second predetermined biometric input of a verification sequence. The device provides a second prompt. The device receives the complete verification sequence user selection in response to the second prompt. Upon determining that at least the first and second biometric inputs (508) and the order of inputs match the predetermined biometric inputs of the verification sequence (510), the device enables receiving a user command.

20 Claims, 5 Drawing Sheets

(56) References Cited

U.S. PATENT DOCUMENTS

| | | |
|---|---|---|
| 4,802,353 A | 2/1989 | Corder et al. |
| 4,864,519 A | 9/1989 | Appleby et al. |
| 4,916,460 A | 4/1990 | Powell |
| 5,039,995 A | 8/1991 | Hulbert |
| 5,156,203 A | 10/1992 | Funakoshi et al. |
| 5,178,191 A | 1/1993 | Schaefer |
| 5,218,356 A | 6/1993 | Knapp |
| 5,224,648 A | 7/1993 | Simon et al. |
| 5,316,073 A | 5/1994 | Klaus et al. |
| 5,355,305 A | 10/1994 | Seem et al. |
| 5,379,455 A | 1/1995 | Koschek |
| 5,414,640 A | 5/1995 | Seem |
| 5,475,377 A | 12/1995 | Lee |
| 5,506,768 A | 4/1996 | Seem et al. |
| 5,550,752 A | 8/1996 | Federspiel |
| 5,555,195 A | 9/1996 | Jensen et al. |
| 5,555,196 A | 9/1996 | Asano |
| 5,568,377 A | 10/1996 | Seem et al. |
| 5,590,830 A | 1/1997 | Kettler et al. |
| 5,682,329 A | 10/1997 | Seem et al. |
| RE35,736 E | 2/1998 | Powell |
| 5,737,318 A | 4/1998 | Melnik |
| 5,748,100 A | 5/1998 | Gutman et al. |
| 5,762,265 A | 6/1998 | Kitamura et al. |
| 5,769,315 A | 6/1998 | Drees |
| 5,791,408 A | 8/1998 | Seem |
| 5,867,384 A | 2/1999 | Drees et al. |
| 5,960,214 A | 9/1999 | Sharpe, Jr. et al. |
| 6,006,142 A | 12/1999 | Seem et al. |
| 6,014,546 A | 1/2000 | Georges et al. |
| 6,033,302 A | 3/2000 | Ahmed et al. |
| 6,095,426 A | 8/2000 | Ahmed et al. |
| 6,122,605 A | 9/2000 | Drees et al. |
| 6,141,595 A | 10/2000 | Gloudeman et al. |
| 6,195,698 B1 | 2/2001 | Lillibridge et al. |
| 6,219,590 B1 | 4/2001 | Bernaden et al. |
| 6,219,950 B1 | 4/2001 | Hsu |
| 6,223,544 B1 | 5/2001 | Seem |
| 6,265,843 B1 | 7/2001 | West et al. |
| 6,296,193 B1 | 10/2001 | West et al. |
| 6,353,853 B1 | 3/2002 | Gravlin |
| 6,369,716 B1 | 4/2002 | Abbas et al. |
| 6,389,331 B1 | 5/2002 | Jensen et al. |
| 6,393,139 B1* | 5/2002 | Lin .......................... G07C 9/37 382/125 |
| 6,400,265 B1 | 6/2002 | Saylor et al. |
| 6,408,228 B1 | 6/2002 | Seem et al. |
| 6,415,617 B1 | 7/2002 | Seem |
| 6,421,453 B1* | 7/2002 | Kanevsky ............ G06F 21/316 340/5.2 |
| 6,437,692 B1 | 8/2002 | Petite et al. |
| 6,477,439 B1 | 11/2002 | Bernaden et al. |
| 6,480,889 B1 | 11/2002 | Saito et al. |
| 6,486,778 B2 | 11/2002 | Mahler et al. |
| 6,594,554 B1 | 7/2003 | Seem et al. |
| 6,618,806 B1* | 9/2003 | Brown .................... G06F 21/32 709/225 |
| 6,759,956 B2 | 7/2004 | Menard et al. |
| 6,816,811 B2 | 11/2004 | Seem |
| 6,826,607 B1 | 11/2004 | Gelvin et al. |
| 6,829,513 B2 | 12/2004 | Piersanti et al. |
| 6,842,430 B1 | 1/2005 | Melnik |
| 6,862,540 B1 | 3/2005 | Welch et al. |
| 6,874,691 B1 | 4/2005 | Hildebrand et al. |
| 6,898,542 B2 | 5/2005 | Ott et al. |
| 6,916,239 B2 | 7/2005 | Siddaramanna et al. |
| 6,919,790 B2 | 7/2005 | Kanazawa |
| 6,928,558 B1 | 8/2005 | Allahwerdi et al. |
| 6,937,909 B2 | 8/2005 | Seem |
| 6,959,356 B2 | 10/2005 | Packwood et al. |
| 7,010,294 B1 | 3/2006 | Pyotsia et al. |
| 7,031,880 B1 | 4/2006 | Seem et al. |
| 7,053,767 B2 | 5/2006 | Petite et al. |
| 7,053,770 B2 | 5/2006 | Ratiu et al. |
| 7,065,349 B2 | 6/2006 | Nath et al. |
| 7,085,623 B2 | 8/2006 | Siegers |
| 7,089,089 B2 | 8/2006 | Cumming et al. |
| 7,103,511 B2 | 9/2006 | Petite |
| 7,113,090 B1 | 9/2006 | Saylor et al. |
| 7,124,637 B2 | 10/2006 | Singhal et al. |
| 7,130,719 B2 | 10/2006 | Ehlers et al. |
| 7,132,757 B2 | 11/2006 | Steigerwald et al. |
| 7,148,803 B2 | 12/2006 | Bandy et al. |
| 7,170,201 B2 | 1/2007 | Hamel et al. |
| 7,176,601 B2 | 2/2007 | Tanaka et al. |
| 7,248,151 B2 | 7/2007 | Mc Call |
| 7,251,570 B2 | 7/2007 | Hancock et al. |
| 7,284,372 B2 | 10/2007 | Crow |
| 7,302,570 B2 | 11/2007 | Beard et al. |
| 7,317,927 B2 | 1/2008 | Staton et al. |
| 7,321,316 B2 | 1/2008 | Hancock et al. |
| 7,349,360 B2 | 3/2008 | Gutierrez et al. |
| 7,363,031 B1 | 4/2008 | Aisa |
| 7,378,980 B2 | 5/2008 | Mcfarland |
| 7,379,390 B2 | 5/2008 | Mcfarland |
| 7,382,271 B2 | 6/2008 | Mcfarland |
| 7,388,886 B2 | 6/2008 | Perkins et al. |
| 7,406,300 B2 | 7/2008 | Pan |
| 7,426,452 B2 | 9/2008 | Zielinski et al. |
| 7,433,740 B2 | 10/2008 | Hesse et al. |
| 7,436,797 B2 | 10/2008 | Shepard et al. |
| 7,468,661 B2 | 12/2008 | Petite et al. |
| 7,479,727 B1 | 1/2009 | Grace |
| 7,496,472 B2 | 2/2009 | Seem |
| 7,545,267 B2 | 6/2009 | Stortoni |
| 7,554,941 B2 | 6/2009 | Ratiu et al. |
| 7,559,529 B2 | 7/2009 | Affaticati et al. |
| 7,586,888 B2 | 9/2009 | Wang |
| 7,623,826 B2 | 11/2009 | Pergal |
| 7,640,007 B2 | 12/2009 | Chen et al. |
| 7,653,010 B2 | 1/2010 | Ensor et al. |
| 7,653,394 B2 | 1/2010 | Mcmillin |
| 7,660,701 B2 | 2/2010 | Sharpe, Jr. |
| 7,660,892 B2 | 2/2010 | Choong et al. |
| 7,728,715 B2 | 6/2010 | Riedel et al. |
| 7,729,882 B2 | 6/2010 | Seem |
| 7,751,828 B2 | 7/2010 | Kim et al. |
| 7,752,309 B2 | 7/2010 | Keyghobad et al. |
| 7,778,627 B2 | 8/2010 | Badt, Jr. |
| 7,799,560 B2 | 9/2010 | Wilson et al. |
| 7,827,813 B2 | 11/2010 | Seem |
| 7,869,805 B2 | 1/2011 | Schnaare et al. |
| 7,898,147 B2 | 3/2011 | Grabinger et al. |
| 7,908,126 B2 | 3/2011 | Bahel et al. |
| 7,929,805 B2 | 4/2011 | Wang et al. |
| 7,970,350 B2 | 6/2011 | Sheynman et al. |
| 8,005,514 B2 | 8/2011 | Saito et al. |
| 8,027,742 B2 | 9/2011 | Seem et al. |
| 8,036,594 B2 | 10/2011 | Schadler |
| 8,049,361 B2 | 11/2011 | Kielb et al. |
| 8,120,460 B1 | 2/2012 | Zhu |
| 8,255,090 B2 | 8/2012 | Frader-Thompson et al. |
| 8,281,174 B2 | 10/2012 | Seiler |
| 8,350,694 B1 | 1/2013 | Trundle et al. |
| 8,370,483 B2 | 2/2013 | Choong et al. |
| 8,380,637 B2* | 2/2013 | Levovitz ............... G06Q 20/40 705/64 |
| 8,430,310 B1 | 4/2013 | Ho et al. |
| 8,459,560 B1 | 6/2013 | Mineo-Goggin |
| 8,502,835 B1 | 8/2013 | Meehan |
| 8,665,084 B2 | 3/2014 | Shapiro et al. |
| 8,675,071 B1 | 3/2014 | Slavin et al. |
| 8,682,245 B2 | 3/2014 | Fyke et al. |
| 8,725,081 B2 | 5/2014 | Kantzes et al. |
| 8,756,431 B1 | 6/2014 | Despain et al. |
| 8,844,811 B1 | 9/2014 | Rogers et al. |
| 8,929,948 B2 | 1/2015 | Vanderaa et al. |
| 8,933,778 B2 | 1/2015 | Birkel et al. |
| 8,965,460 B1 | 2/2015 | Rao et al. |
| 8,970,348 B1* | 3/2015 | Evans .................... G06F 21/32 340/5.83 |
| 9,008,804 B2 | 4/2015 | Junk et al. |
| 9,024,717 B2 | 5/2015 | Songakul et al. |
| 9,049,212 B2 | 6/2015 | Segre |

(56) References Cited

U.S. PATENT DOCUMENTS

| | | |
|---|---|---|
| 9,049,644 B2 | 6/2015 | Bahr et al. |
| 9,109,379 B1 | 8/2015 | Ranchod |
| 9,119,068 B1 | 8/2015 | Hubble |
| 9,119,236 B1 | 8/2015 | Martin |
| 9,141,150 B1 * | 9/2015 | Trundle ............... G06F 3/017 |
| 9,235,980 B2 | 1/2016 | Sharma et al. |
| 9,275,208 B2 * | 3/2016 | Protopapas ............ G06F 21/31 |
| 9,397,989 B1 | 7/2016 | Ramalingam et al. |
| 9,536,236 B2 | 1/2017 | Hay |
| 9,679,453 B2 | 6/2017 | Flint et al. |
| 9,697,656 B2 | 7/2017 | Trani |
| 9,729,342 B2 | 8/2017 | Cohn et al. |
| 10,037,528 B2 | 7/2018 | Gardiner et al. |
| 10,102,360 B2 * | 10/2018 | Mohan .................... G06F 21/32 |
| 10,356,096 B2 * | 7/2019 | Serban ............... H04L 63/0853 |
| 10,665,244 B1 * | 5/2020 | Gupta ................. H04M 3/5166 |
| 10,868,672 B1 * | 12/2020 | Farrugia .............. H04L 9/0861 |
| 11,521,424 B2 * | 12/2022 | Park .................. H04M 1/72454 |
| 11,533,302 B2 * | 12/2022 | Denker ............... G06Q 10/087 |
| D976,904 S * | 1/2023 | Fortino ........................ D14/383 |
| 11,551,219 B2 * | 1/2023 | Liu ......................... G06F 18/22 |
| 11,563,729 B2 * | 1/2023 | Hirosawa ............. H04W 12/06 |
| 11,606,690 B1 * | 3/2023 | Robinson ............. H04W 84/12 |
| 11,687,153 B2 * | 6/2023 | Tobin ...................... G06F 3/012 345/649 |
| 11,695,759 B1 * | 7/2023 | Rao .................... H04L 63/0861 726/7 |
| 11,706,212 B2 * | 7/2023 | Matute ............... H04L 63/0853 704/4 |
| 11,720,656 B2 * | 8/2023 | Oung ................ G06F 21/32 713/186 |
| 11,727,226 B2 * | 8/2023 | Rodriguez ............ H04L 9/3234 726/5 |
| 11,736,477 B1 * | 8/2023 | Rao ........................ G06F 21/316 |
| 11,741,837 B2 * | 8/2023 | Vallance ................. G08G 1/148 340/932.2 |
| 11,741,970 B2 * | 8/2023 | Rubin .................... G06F 21/32 704/238 |
| 11,743,723 B2 * | 8/2023 | Angelov ............ H04W 28/0226 726/4 |
| 11,783,727 B1 * | 10/2023 | Kelly .................... G06F 3/04815 |
| 11,792,189 B1 * | 10/2023 | Gaeta .................... G06V 40/20 |
| 11,854,329 B2 * | 12/2023 | Read .................. G07C 9/00904 |
| 11,991,175 B2 * | 5/2024 | Rolfe .................. H04L 63/0861 |
| 12,003,956 B2 * | 6/2024 | Naujok ............... H04L 63/1425 |
| 12,019,723 B2 * | 6/2024 | Shin ........................ G06F 21/57 |
| 12,021,872 B2 * | 6/2024 | Butler ................. H04L 63/0428 |
| 12,022,282 B2 * | 6/2024 | Rolfe ..................... H04L 9/3242 |
| 12,034,719 B2 * | 7/2024 | Budman .............. H04L 63/107 |
| 12,034,720 B1 * | 7/2024 | Tuomikoski ......... H04L 63/205 |
| 12,047,773 B2 * | 7/2024 | Dutt ....................... H04W 12/06 |
| 12,125,149 B2 * | 10/2024 | Burton .................. G06V 20/20 |
| 12,131,429 B2 * | 10/2024 | Li ............................ G06F 3/011 |
| 12,158,937 B2 * | 12/2024 | Abdou .................... G06F 21/41 |
| 2001/0049785 A1 * | 12/2001 | Kawan ................... G06F 21/32 713/186 |
| 2002/0099945 A1 | 7/2002 | Mclintock et al. |
| 2002/0152298 A1 | 10/2002 | Kikta et al. |
| 2003/0018724 A1 | 1/2003 | Mathewson, II et al. |
| 2003/0101009 A1 | 5/2003 | Seem |
| 2003/0132829 A1 | 7/2003 | Frolov et al. |
| 2003/0151513 A1 | 8/2003 | Herrmann et al. |
| 2003/0158760 A1 | 8/2003 | Kannenberg |
| 2003/0160693 A1 | 8/2003 | Hisano |
| 2003/0216837 A1 | 11/2003 | Reich et al. |
| 2004/0212503 A1 | 10/2004 | Stilp |
| 2004/0235468 A1 | 11/2004 | Luebke et al. |
| 2005/0059418 A1 | 3/2005 | Northcutt |
| 2005/0066049 A1 | 3/2005 | Clevy et al. |
| 2005/0110634 A1 | 5/2005 | Salcedo et al. |
| 2005/0113943 A1 | 5/2005 | Nian |
| 2005/0165806 A1 | 7/2005 | Roatis et al. |
| 2005/0228509 A1 | 10/2005 | James |
| 2005/0275505 A1 | 12/2005 | Himmelstein |
| 2005/0285716 A1 | 12/2005 | Denison et al. |
| 2006/0007945 A1 | 1/2006 | Schoettle et al. |
| 2006/0063522 A1 | 3/2006 | Mcfarland |
| 2006/0063523 A1 | 3/2006 | Mcfarland |
| 2006/0104197 A1 | 5/2006 | Proctor et al. |
| 2006/0193262 A1 | 8/2006 | Mcsheffrey et al. |
| 2007/0004436 A1 | 1/2007 | Stirbu |
| 2007/0032221 A1 | 2/2007 | Badt |
| 2007/0097993 A1 | 5/2007 | Bojahra et al. |
| 2007/0140530 A1 * | 6/2007 | Coogan ............... G06F 3/04886 340/5.53 |
| 2007/0191075 A1 | 8/2007 | Greene et al. |
| 2007/0273474 A1 | 11/2007 | Levine |
| 2008/0024267 A1 | 1/2008 | Jones et al. |
| 2008/0088437 A1 | 4/2008 | Aninye et al. |
| 2008/0133930 A1 | 6/2008 | Moshir et al. |
| 2008/0179408 A1 | 7/2008 | Seem |
| 2008/0277486 A1 | 11/2008 | Seem et al. |
| 2008/0290986 A1 | 11/2008 | Laughlin-Parker et al. |
| 2008/0313182 A1 | 12/2008 | Vasa |
| 2009/0045939 A1 | 2/2009 | Holland et al. |
| 2009/0065596 A1 | 3/2009 | Seem et al. |
| 2009/0136231 A1 | 5/2009 | Lai |
| 2009/0141661 A1 | 6/2009 | Li et al. |
| 2009/0166439 A1 | 7/2009 | Su |
| 2009/0241055 A1 | 9/2009 | Augustine et al. |
| 2009/0249076 A1 | 10/2009 | Reed et al. |
| 2009/0265583 A1 | 10/2009 | Bouse et al. |
| 2009/0289956 A1 | 11/2009 | Douris et al. |
| 2009/0307255 A1 | 12/2009 | Park |
| 2010/0060790 A1 | 3/2010 | Lee |
| 2010/0121968 A1 | 5/2010 | Clark |
| 2010/0283579 A1 | 11/2010 | Kraus et al. |
| 2011/0061100 A1 | 3/2011 | Mattila et al. |
| 2011/0099612 A1 | 4/2011 | Lee et al. |
| 2011/0105220 A1 | 5/2011 | Hill et al. |
| 2011/0195665 A1 | 8/2011 | Friedlaender |
| 2012/0075059 A1 | 3/2012 | Fyke et al. |
| 2012/0077431 A1 | 3/2012 | Fyke et al. |
| 2012/0110677 A1 | 5/2012 | Abendroth et al. |
| 2012/0130714 A1 | 5/2012 | Zeljkovic et al. |
| 2012/0185397 A1 * | 7/2012 | Levovitz ................ G06Q 20/40 705/44 |
| 2012/0252420 A1 | 10/2012 | Czaja et al. |
| 2012/0280790 A1 | 11/2012 | Gerhardt et al. |
| 2012/0290591 A1 | 11/2012 | Flynn et al. |
| 2013/0008213 A1 | 1/2013 | Brown et al. |
| 2013/0043973 A1 | 2/2013 | Greisen et al. |
| 2013/0049928 A1 | 2/2013 | Moore et al. |
| 2013/0126161 A1 | 5/2013 | Rule et al. |
| 2013/0129161 A1 * | 5/2013 | Goel ...................... G06V 40/28 382/124 |
| 2013/0141587 A1 | 6/2013 | Petricoin, Jr. |
| 2013/0221094 A1 | 8/2013 | Smith et al. |
| 2013/0227651 A1 * | 8/2013 | Schultz .................. G06F 21/32 726/4 |
| 2013/0262275 A1 | 10/2013 | Outwater et al. |
| 2014/0004826 A1 | 1/2014 | Addy et al. |
| 2014/0012655 A1 | 1/2014 | Polak et al. |
| 2014/0049361 A1 | 2/2014 | Ahearn et al. |
| 2014/0059675 A1 * | 2/2014 | Batie, Jr. ................ G06F 21/32 726/19 |
| 2014/0086124 A1 | 3/2014 | Knowles |
| 2014/0101740 A1 * | 4/2014 | Li ........................... G06F 21/32 726/7 |
| 2014/0109200 A1 * | 4/2014 | Tootill .................... G06F 21/32 726/5 |
| 2014/0118107 A1 | 5/2014 | Almomani |
| 2014/0196119 A1 * | 7/2014 | Hill ........................ G06F 21/30 726/4 |
| 2014/0253285 A1 | 9/2014 | Menzel |
| 2014/0266573 A1 | 9/2014 | Sullivan |
| 2014/0292481 A1 | 10/2014 | Dumas et al. |
| 2014/0310788 A1 * | 10/2014 | Ricci ....................... H04W 4/12 726/6 |
| 2014/0334684 A1 | 11/2014 | Strimling |
| 2015/0067792 A1 | 3/2015 | Benoit et al. |
| 2015/0145648 A1 | 5/2015 | Winkelman |

(56) References Cited

U.S. PATENT DOCUMENTS

| | | |
|---|---|---|
| 2015/0154598 A1 | 6/2015 | Forte et al. |
| 2015/0204561 A1 | 7/2015 | Sadwick et al. |
| 2015/0221151 A1 | 8/2015 | Bacco et al. |
| 2015/0223085 A1 | 8/2015 | Siomina |
| 2015/0223169 A1 | 8/2015 | Ghosh |
| 2015/0227734 A1* | 8/2015 | Mucci ............... H04W 12/065 726/19 |
| 2015/0228133 A1 | 8/2015 | Capaldi-Tallon |
| 2015/0228139 A1 | 8/2015 | Geerlings et al. |
| 2015/0229626 A1 | 8/2015 | Hauhn |
| 2015/0278495 A1* | 10/2015 | Yu ..................... H04L 9/3239 713/186 |
| 2015/0310685 A1 | 10/2015 | Bliding et al. |
| 2015/0317597 A1 | 11/2015 | Shucker et al. |
| 2015/0332531 A1 | 11/2015 | Davidsson et al. |
| 2016/0014103 A1 | 1/2016 | Masters et al. |
| 2016/0020910 A1 | 1/2016 | Jones et al. |
| 2016/0035246 A1 | 2/2016 | Curtis |
| 2016/0037449 A1 | 2/2016 | Kandhalu Raghu et al. |
| 2016/0047565 A1 | 2/2016 | Robinson |
| 2016/0055692 A1 | 2/2016 | Trani |
| 2016/0055698 A1 | 2/2016 | Gudmundsson et al. |
| 2016/0063853 A1 | 3/2016 | Mi |
| 2016/0098622 A1 | 4/2016 | Ramachandrula et al. |
| 2016/0104334 A1 | 4/2016 | Handville et al. |
| 2016/0116177 A1 | 4/2016 | Sikora et al. |
| 2016/0125676 A1 | 5/2016 | Pouille |
| 2016/0127995 A1 | 5/2016 | Merlin et al. |
| 2016/0163137 A1 | 6/2016 | Strulovitch et al. |
| 2016/0171808 A1 | 6/2016 | Caterino et al. |
| 2016/0210827 A1 | 7/2016 | Fu et al. |
| 2016/0217638 A1 | 7/2016 | Child et al. |
| 2016/0239653 A1 | 8/2016 | Loughlin-Mchugh et al. |
| 2016/0258640 A1 | 9/2016 | Grabinger et al. |
| 2016/0284144 A1 | 9/2016 | Michalscheck et al. |
| 2016/0352516 A1 | 12/2016 | Oberheide et al. |
| 2017/0026907 A1 | 1/2017 | Min et al. |
| 2017/0061110 A1* | 3/2017 | Wright ................ G06F 21/32 |
| 2017/0061717 A1 | 3/2017 | Ouyang et al. |
| 2017/0064261 A1 | 3/2017 | Peng et al. |
| 2017/0076415 A1 | 3/2017 | Ng-Thow-Hing et al. |
| 2017/0098335 A1 | 4/2017 | Payack, Jr. |
| 2017/0180539 A1 | 6/2017 | Payack, Jr. |
| 2017/0199994 A1 | 7/2017 | Shalev et al. |
| 2017/0213404 A1 | 7/2017 | Sivalingam et al. |
| 2017/0220872 A1 | 8/2017 | Child et al. |
| 2017/0331807 A1 | 11/2017 | Mont-Reynaud et al. |
| 2018/0007549 A1 | 1/2018 | Sanders |
| 2018/0009416 A1 | 1/2018 | Maiwand et al. |
| 2018/0020407 A1 | 1/2018 | Emmanuel et al. |
| 2018/0027386 A1 | 1/2018 | Zampini, II |
| 2018/0027495 A1 | 1/2018 | Song et al. |
| 2018/0075681 A1 | 3/2018 | Scalisi et al. |
| 2018/0129885 A1 | 5/2018 | Potter et al. |
| 2018/0139332 A1 | 5/2018 | Kerzner |
| 2018/0189469 A1* | 7/2018 | Nam .................. H04L 63/083 |
| 2018/0204399 A1 | 7/2018 | Newman |
| 2018/0241750 A1* | 8/2018 | Serban ............... H04L 63/10 |
| 2018/0260777 A1 | 9/2018 | Judge |
| 2018/0293367 A1* | 10/2018 | Urman .............. G06F 21/32 |
| 2019/0007902 A1 | 1/2019 | Khaled et al. |
| 2019/0064415 A1 | 2/2019 | Ogden et al. |
| 2019/0139343 A1 | 5/2019 | Lien |
| 2019/0327448 A1 | 10/2019 | Fu et al. |
| 2019/0347916 A1 | 11/2019 | Wild et al. |
| 2020/0012771 A1* | 1/2020 | Shah ................. H04L 9/3231 |
| 2020/0186522 A1* | 6/2020 | Apturkar ........... H04L 9/3231 |
| 2020/0193011 A1* | 6/2020 | Ruster .............. G06F 21/445 |
| 2020/0236539 A1* | 7/2020 | Santos ............. H04W 12/02 |
| 2021/0407240 A1* | 12/2021 | Jaber ................. G06F 21/32 |
| 2023/0195862 A1* | 6/2023 | Einstein ............ G06F 21/31 726/2 |
| 2024/0338429 A1* | 10/2024 | Einstein ............ G06F 21/31 |

FOREIGN PATENT DOCUMENTS

| | | |
|---|---|---|
| CN | 2833675 Y | 11/2006 |
| CN | 101112077 A | 1/2008 |
| CN | 101299299 A | 11/2008 |
| CN | 103942863 A | 7/2014 |
| CN | 105139491 A | 12/2015 |
| CN | 105871874 A | 8/2016 |
| CN | 107170092 A | 9/2017 |
| EP | 1154365 A1 | 11/2001 |
| EP | 1241633 A2 | 9/2002 |
| EP | 957418 B1 | 1/2003 |
| EP | 1309062 A2 | 5/2003 |
| EP | 2763106 A2 | 8/2014 |
| EP | 2858385 A1 | 4/2015 |
| EP | 2900533 A1 | 8/2015 |
| EP | 3136273 A1 | 3/2017 |
| EP | 3200161 A1 | 8/2017 |
| EP | 3445046 A1 | 2/2019 |
| GB | 2372126 A | 8/2002 |
| JP | 2011179170 A | 9/2011 |
| KR | 101259546 B1 | 4/2013 |
| KR | 1020150134806 A | 12/2015 |
| KR | 1020170035644 A | 3/2017 |
| SU | 535103 A1 | 11/1976 |
| WO | 9530114 A1 | 11/1995 |
| WO | 0035209 A1 | 6/2000 |
| WO | 0068744 A1 | 11/2000 |
| WO | 0208551 A1 | 1/2002 |
| WO | 03023536 A1 | 3/2003 |
| WO | 2006053211 A2 | 5/2006 |
| WO | 2009012282 A2 | 1/2009 |
| WO | 2009018215 A1 | 2/2009 |
| WO | 2009024925 A3 | 8/2009 |
| WO | 2009116682 A1 | 9/2009 |
| WO | 2015085434 A1 | 6/2015 |
| WO | 2016007332 A1 | 1/2016 |
| WO | 2016130777 A1 | 8/2016 |
| WO | 2017008279 A1 | 1/2017 |
| WO | 2017054840 A1 | 4/2017 |
| WO | 20180213648 A1 | 11/2018 |
| WO | 2019070232 A1 | 4/2019 |

OTHER PUBLICATIONS

Fountain et al., "Comfort Control for Short-Term Occupancy," Energy and Buildings, vol. 21, pp. 1-13, 1994.

Hosni et al., "Experimental Results for Heat Gain and Radiant/Convective Split from Equipment in Buildings," ASH RAE Transactions 1999, vol. 5, Part 2, 13 pages, 1999.

Rice et al., "An Evaluation of Hospital Special-Ventilation-Room Pressures," Infection Control and Hospital Epidemiology, vol. 22, No. 1, pp. 19-23, Jan. 2001.

Churchill et al., "Strain Energy Harvesting for Wireless Sensor Networks," Proceedings of SPIE, vol. 5055, pp. 319-327, 2003.

American Society of Heating, Refrigerating and Air-Conditioning Engineers, Inc., "ASHRAE Addenda a,b,c,d, and g to ANSI/ASHRAE Standard 62, 1—2004," 28 pages, 2006.

Katz, "Residential Piezoelectric Energy Sources,", 7 pages, Jul. 21, 2004.

Kaushal et al., "Environmental Control Including Ventilation in Hospitals," JK Science, Hospital Notes, vol. 6, No. 4, pp. 229-232, Oct.-Dec. 2004.

Thomas et al., "Feed-Forward in Temperature Control of Buildings," Energy and Buildings, vol. 37, pp. 755-761, 2005.

Castelvecchi, "Wireless Energy May Power Electronics," MIT TechTalk, vol. 51, No. 9, 8 pages, Nov. 15, 2006.

Lowton et al., "Finding Nemo: On the Accuracy of Inferring Location in IEEE 802.15.4 Networks," ACM, 5 pages, 2006.

Minkel, "Wireless Energy Transfer May Power Devices at a Distance," downloaded from http://www.scientificamerican.com/article/wireless-energy-transfer/, 3 pages, Nov. 14, 2006.

Ramachandran, "Establishing A Regulatory Framework for Distributed Antenna Systems," Thesis Submitted to University of Colorado, 76 p. 2008.

(56) References Cited

OTHER PUBLICATIONS

Teng et al., A Survey on Real-Time MAC Protocols in Wireless Sensor Networks, Communications and Network, 2010, 2, pp. 104-112.
Castellanos, "Nest Competitor Zstat Launches Crowdfunding for Wireless Thermostat," downloaded from http://www.bizjournals.com/boston/blog/startups/2014/01/nest-comp . . . , 2 pages, printed Sep. 12, 2014.
Karalis et al., "Wireless Non-Radiative Energy Transfer," 17 pages, prior to Mar. 4, 2015.
Lawrence et al., "Adaptive Thermostat With Bluetooth Technology," ECE4007L02, Group 7, Georgia Institute of Technology, 15 pages, downloaded Apr. 27, 2015.
International Search Report and Written Opinion of the International Application No. PCT/CN2021/073184, mailed Jun. 25, 2021, 11 pg.

\* cited by examiner

ENHANCED SEQUENTIAL BIOMETRIC VERIFICATION

RELATED APPLICATIONS

This application is a 35 U.S.C. 371 national stage filing from International Application No. PCT/CN2021/073184, filed Jan. 22, 2021, the entire contents of which is incorporated herein by reference.

TECHNICAL FIELD

The disclosure relates to security systems that utilize biometric verification.

BACKGROUND

Fingerprint recognition to grant a user authorized access to a computing device is a popular security tool. This technology could be added to security panels to make arming or disarming the security panel more convenient. However, current fingerprint recognition technology still includes some security risk where fake fingerprints can fool the fingerprint sensor. Most applications only recognize a single fingerprint, and if this fingerprint matches the stored fingerprint, the device will grant the user authorization to access the device. This may not be safe enough for some high-level security requirements.

SUMMARY

In general, the disclosure provides a sequential biometric verification process to enhance the security level of a panel with fingerprint sensor. Rather than simply requesting a single biometric verification, or asking for particular biometric information for verification, a computing device receives, open-endedly, a number of biometric inputs from a user. That particular user has a predefined sequence of varying biometric inputs, ranging from specific fingers on specific hands to facial or ocular recognition or any other biometric input suitable for the device in which the verification process is implemented, as their passcode, of sorts. After each biometric input, the computing device prompts the user for whether the user wishes to provide more biometric inputs or if the user believes the sequence is complete. As the user wishes to provide more biometric inputs, the user selects the option within the prompt to provide more biometric inputs, and the computing device receives those inputs. The computing device receives a selection of the completion of the input process. If the computing device determines that each biometric input matches an expected, predetermined biometric input in the valid sequence (i.e., both that the provided biometric input meets a validity threshold in comparison to the stored biometric input and that the order of biometric inputs provided is the same as the order provided in the valid sequence), then the computing device may provide access to the user.

In one example, the disclosure is directed to a method in which a computing device receives, from a user, a first biometric input. The method further includes determining that the first biometric input matches a first predetermined biometric input of a verification sequence. The method also includes, after receiving the first biometric input at the computing device, providing a first prompt to the user, the first prompt including a first request for at least one of a next biometric input user selection and a complete verification sequence user selection. The method further includes receiving, from the user, the next biometric input user selection in response to the first prompt. The method also includes receiving, from the user, a second biometric input at the computing device. The method further includes determining that the second biometric input matches a second predetermined biometric input of a verification sequence. The method also includes, after receiving the second biometric input at the computing device, providing a second prompt to the user, the second prompt including a second request for at least one of the next biometric input user selection and the complete verification sequence user selection. The method further includes receiving, from the user, the complete verification sequence user selection in response to the second prompt. The method also includes after i) receiving the complete verification sequence user selection, and ii) upon determining that at least the first biometric input matches the first predetermined biometric input of the verification sequence, the second biometric input matches the second predetermined biometric input of the verification sequence, and an order in which the first biometric input and the second biometric input is received matches a predetermined biometric input order for the first biometric input and the second biometric input required by the verification sequence, enabling the computing device to receive a user command.

In another example, the disclosure is directed to a non-transitory computer-readable storage medium containing instructions. The instructions, when executed, cause one or more processors to receive, by one or more processors of the computing device, a first biometric input. The instructions, when executed, further cause one or more processors to determine, by the one or more processors of the computing device, that the first biometric input matches a first predetermined biometric input of a verification sequence. The instructions, when executed, also cause one or more processors to after receiving the first biometric input, provide, by the one or more processors of the computing device, a first prompt, the first prompt including a first request for at least one of a next biometric input user selection and a complete verification sequence user selection. The instructions, when executed, further cause one or more processors to receive, by the one or more processors of the computing device, the next biometric input user selection in response to the first prompt. The instructions, when executed, also cause one or more processors to receive, by the one or more processors of the computing device, a second biometric input. The instructions, when executed, further cause one or more processors to determine, by the one or more processors of the computing device, that the second biometric input matches a second predetermined biometric input of a verification sequence. The instructions, when executed, also cause one or more processors to after receiving the second biometric input, provide, by the one or more processors of the computing device, a second prompt to the user, the second prompt including a second request for at least one of the next biometric input user selection and the complete verification sequence user selection. The instructions, when executed, further cause one or more processors to receive, by the one or more processors of the computing device, the complete verification sequence user selection in response to the second prompt. The instructions, when executed, also cause one or more processors to, after i) receiving, by the one or more processors of the computing device, the complete verification sequence user selection, and ii) upon determining, by the one or more processors of the computing device, that at least the first biometric input matches the first predetermined biometric input of the verification sequence, the second biometric input matches the second predetermined biometric input of the verification sequence, and an order in which the first biometric input and the second biometric input is received matches a predetermined biometric input order for the first biometric input and the second biometric input required by the verification sequence, enable, by the one or more processors of the computing device, receipt of a user command.

In another example, a computing device is configured to receives, from a user, a first biometric input. The computing device is further configured to determine that the first biometric input matches a first predetermined biometric input of a verification sequence. The computing device is further configured to, after receiving the first biometric input at the computing device, provide a first prompt to the user, the first prompt including a first request for at least one of a next biometric input user selection and a complete verification sequence user selection. The computing device is further configured to receive, from the user, the next biometric input user selection in response to the first prompt. The computing device is further configured to receive, from the user, a second biometric input at the computing device. The computing device is further configured to determine that the second biometric input matches a second predetermined biometric input of a verification sequence. The computing device is further configured to, after receiving the second biometric input at the computing device, provide a second prompt to the user, the second prompt including a second request for at least one of the next biometric input user selection and the complete verification sequence user selection. The computing device is further configured to receive, from the user, the complete verification sequence user selection in response to the second prompt. The computing device is further configured to after i) receiving the complete verification sequence user selection, and ii) upon determining that at least the first biometric input matches the first predetermined biometric input of the verification sequence, the second biometric input matches the second predetermined biometric input of the verification sequence, and an order in which the first biometric input and the second biometric input is received matches a predetermined biometric input order for the first biometric input and the second biometric input required by the verification sequence, enable the computing device to receive a user command.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
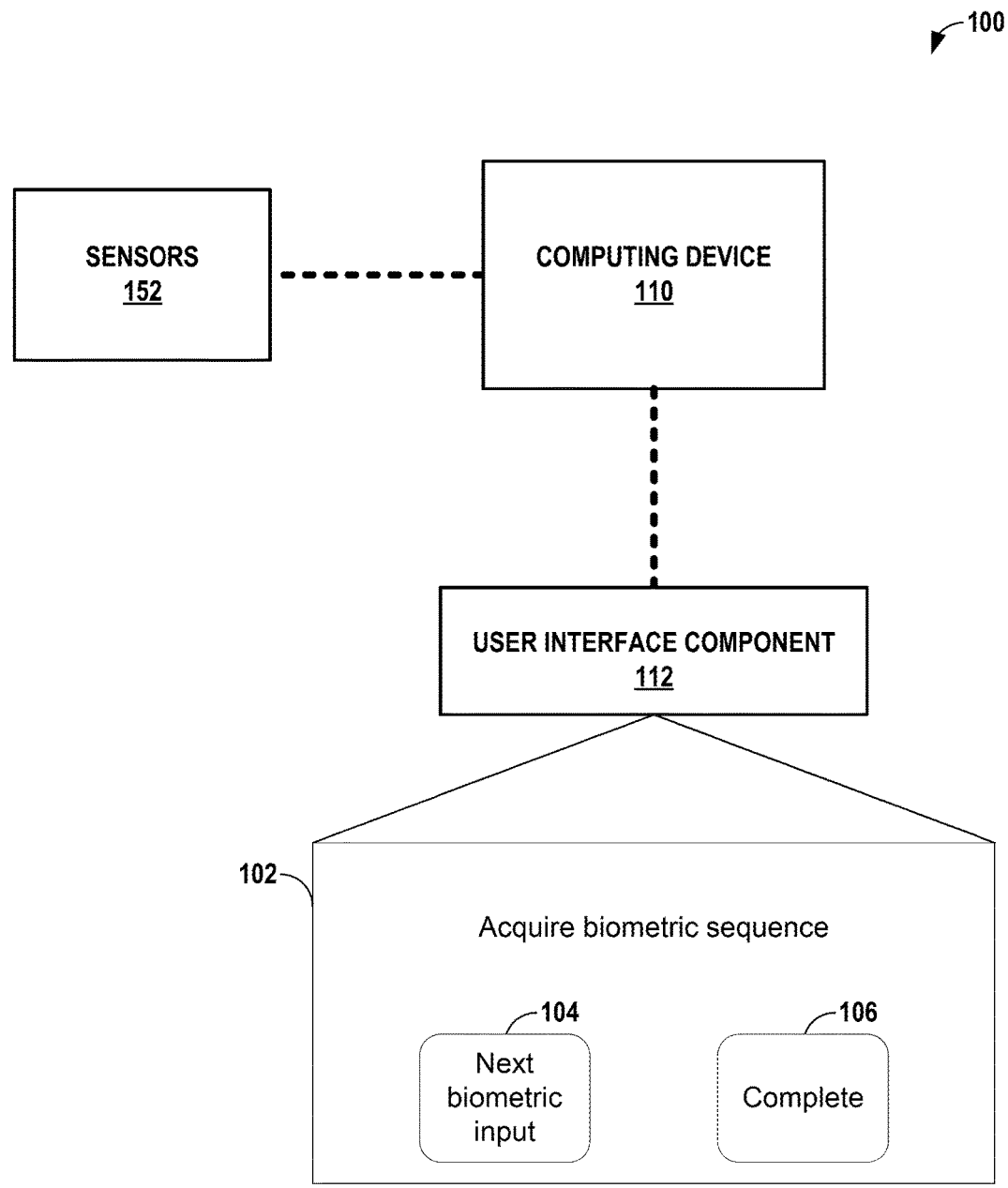
FIG. 1 is a block diagram illustrating an example system that includes a computing device, one or more sensors, and a user interface component configured to output one or more prompts for one or more biometric inputs, in accordance with one or more techniques of this disclosure.

FIG. 1 is a block diagram illustrating an example system 100 that includes a computing device 110, one or more sensors 152, and a user interface (UI) component 112 configured to output one or more prompts 102 for one or more biometric inputs, in accordance with one or more techniques of this disclosure. As shown in FIG. 1, computing device 110 may be communicatively connected to each of sensors 152 and UI component 112. In some instances, one or more of sensors 152 and UI component 112 may be physically integrated into computing device 110, while other instances may include one or more of sensors 152 and UI component 112 being separate components that communicate to computing device 110 over a wired or wireless connection.

Computing device 110 may be any computer with the processing power required to adequately execute the techniques described herein. For instance, computing device 110 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

Sensors 152 may include one or more biometric sensors (e.g., fingerprint sensors, retina scanners, vocal input sensors/microphones, facial recognition sensors, cameras) configured to receive user input in the form of a biometric signature from a user and transmit the biometric input to computing device 110 for processing. Computing device 110 may further include sensors 152 in the form of one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

UI component 112 may be any visual or audible input/output (I/O) component that may be configured to output information to or receive input from a user. For instance, UI component 112 may be a screen, either touch or otherwise, that may display prompt 102 to a user and receive a selection of either selection 104 or selection 106. UI component 112 may also be speakers that output prompt 102 as an audible prompt.

The techniques of this disclosure describe a user-defined fingerprint (or other biometric) sequence to enhance the security level of a computing device (e.g., a security panel) with the necessary sensors that may read the requisite biometric information. For instance, computing device 110 may include a user-facing security option to disable security, to require only a single biometric signature to authorize a command, or may require a sequence of biometric signatures to authorize a command. If the user enables the sequence setting, computing device 110 may request several biometric inputs in order to complete the biometric acquisition step, requiring both the correct biometric signature and the correct sequence to grant the access.

When the user enables the sequence option, computing device 110 may allow the user to input a preferred biometric sequence to initially set the predetermined biometric input verification sequence. If sensors 152 detect a valid biometric input (e.g., one of a fingerprint scan, a facial recognition scan, a retinal scan, or a vocal input), computing device 110 may prompt the user to input a next biometric input or complete the input. In some instances, the user may be limited to a certain number of biometric inputs (e.g., ten), or a particular number of different biometric inputs (e.g., two retinal scans, ten different fingerprints, a single facial recognition scan, etc.) to complete predetermined biometric sequence.

After computing device 110 receives an indication that the predetermined biometric verification sequence is complete, computing device 110 may either store the verification sequence in a data store and associate the sequence with a particular user or request that the user repeat the sequence to verify the sequence prior to storing the verification sequence in the data store.

At a later time, when the user needs to access computing device 110, computing device 110 may issue prompt 102 to the user. Sensors 152 may read one or more biometric inputs from the user and transmit those inputs to computing device 110 for analysis. Computing device 110 may continue issuing instances of prompt 102 via UI component 112 to determine whether the user believes the sequence is complete or whether additional biometric inputs are to be submitted. Once computing device 110 receives the indication that the user believes the sequence is complete, computing device 110 may analyze the received biometric inputs to verify that the biometric inputs match the predetermined biometric inputs provided by the user in the definition process and that the order of the provided biometric inputs match the predetermined biometric sequence provided by the user in the definition process. In some examples, computing device 110 may analyze the received biometric inputs as they are input by the user rather than once the full sequence is input.

In accordance with one or more techniques of this disclosure, computing device 110 receives, from a user, a first biometric input at sensors 152. Computing device 110 determines that the first biometric input matches a first predetermined biometric input of a verification sequence. After receiving the first biometric input, computing device 110 provides a first instance of prompt 102 to the user via UI component 112. Prompt 102 includes a first request for at least one of a next biometric input user selection 104 and a complete verification sequence user selection 106.

Computing device 110 receives, from the user, the next biometric input user selection in response to first prompt 102. Computing device 110 receives, from the user, a second biometric input at sensors 152. Computing device 110 determines that the second biometric input matches a second predetermined biometric input of a verification sequence. After receiving the second biometric input, computing device 110 provides a second prompt, which may be another instance of prompt 102, to the user via UI component 112. The second prompt includes a second request for at least one of the next biometric input user selection 104 and the complete verification sequence user selection 106.

Computing device 110 receives, from the user, the complete verification sequence user selection in response to the second prompt. After receiving the complete verification sequence user selection, and upon computing device 110 determining that at least the first biometric input matches the first predetermined biometric input of the verification sequence, the second biometric input matches the second predetermined biometric input of the verification sequence, and an order in which the first biometric input and the second biometric input is received matches a predetermined biometric input order for the first biometric input and the second biometric input required by the verification sequence, computing device 110 provides authorization to receive a user command.

Rather than not allowing fingerprint input at computing device 110, or using a single fingerprint input, computing device 110 utilizes a sequence of biometric inputs to prove an identity of a user, amounting to an open-ended passcode of indeterminate length with each character being a separate biometric input of the user's choosing (although some examples may include a maximum limit on the biometric sequence length). In this way, the sequence of the inputs becomes is important, as opposed to requiring multiple inputs at once (which would require more expensive hardware). Computing device 110 may issue prompt 102 after each fingerprint is important, either via a visual display on UI components 112 or audibly over UI components 112. In examples where computing device 110 is a control panel for a security system, these biometric sequences could be used to arm or disarm the system. It should be noted that computing device 110 may not require biometric authentication for all actions, such as less risky actions (e.g., turning on or off lights, arming the system, etc.).

Figure 2:
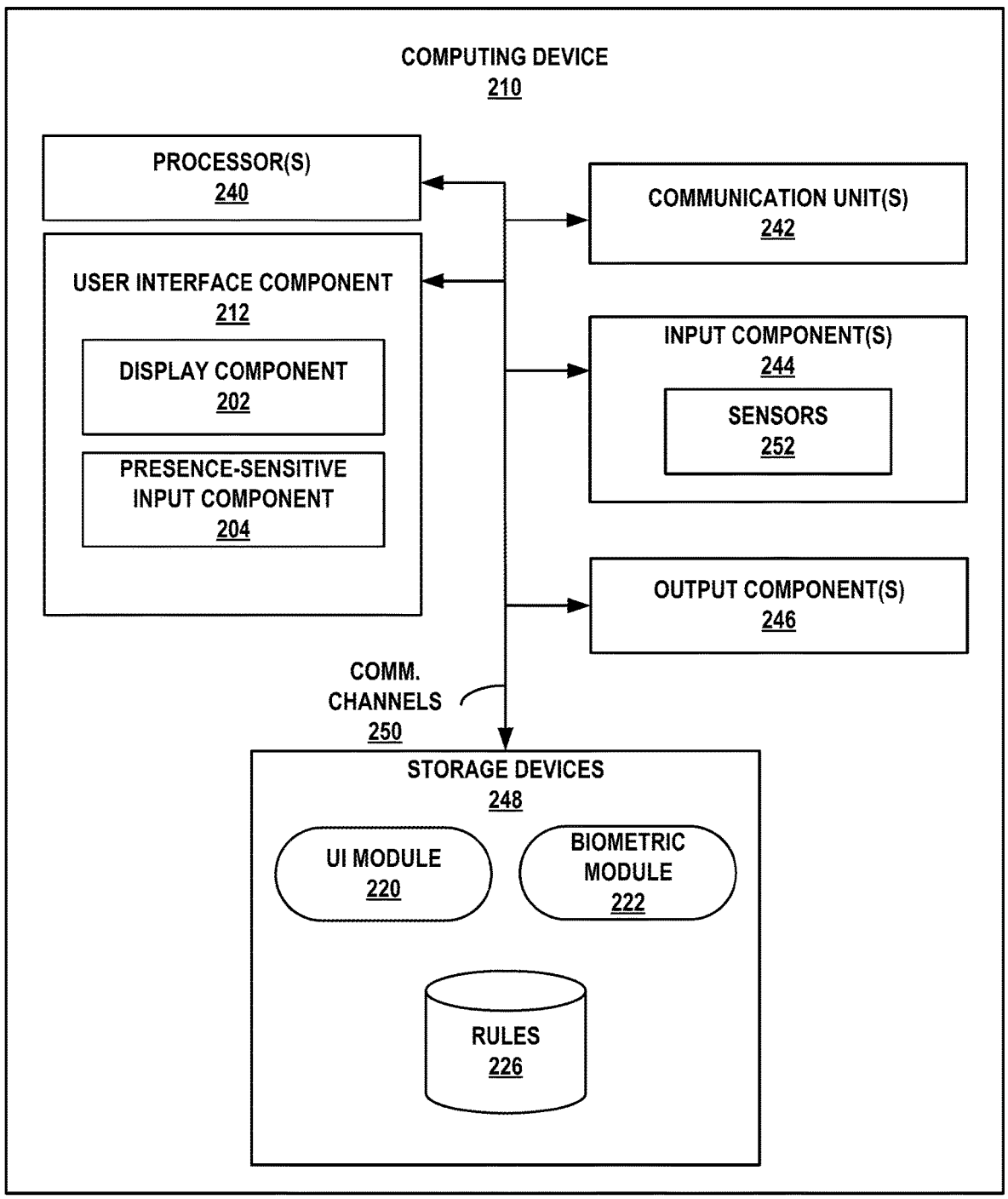
FIG. 2 is a block diagram illustrating a more detailed example of a computing device configured to perform the techniques described herein.

FIG. 2 is a block diagram illustrating a more detailed example of computing device 110, which is configured to perform the techniques described herein. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

Computing device 210 may be any computer with the processing power required to adequately execute the techniques described herein. For instance, computing device 210 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2, computing device 210 includes user interface device (UID) 212, one or more processors 240, one or more communication units 242, one or more input components 244, one or more output components 246, and one or more storage components 248. UI component 212 includes display component 202 and presence-sensitive input component 204. Storage components 248 of computing device 210 include UI module 220, biometric module 222, and rules data store 226.

One or more processors 240 may implement functionality and/or execute instructions associated with computing device 210 to receive, prompt for, and verify a sequence of biometric inputs to grant access to a user for providing more commands to computing device 210. That is, processors 240 may implement functionality and/or execute instructions associated with computing device 210 to receive, analyze, and prompt for further biometric inputs from a user as a security control procedure.

Examples of processors 240 include application processors, display controllers, auxiliary processors, one or more sensor hubs, and any other hardware configure to function as a processor, a processing unit, or a processing device. Modules 218, 220, 222, and 224 may be operable by processors 240 to perform various actions, operations, or functions of computing device 210. For example, processors 240 of computing device 210 may retrieve and execute instructions stored by storage components 248 that cause processors 240 to perform the operations described with respect to modules 220 and 222 and rules data store 226. The instructions, when executed by processors 240, may cause computing device 210 to receive, prompt for, and verify a sequence of biometric inputs to grant access to a user for providing more commands to computing device 210.

UI module 220 may perform operations managing a user interface (e.g., prompt 102) that computing device 210 provides at UI component 212, for example, for facilitating interactions between a user of computing device 210 and computing device 210 itself. For example, UI module 220 of computing device 210 may receive indications of biometric input via sensors 252 and indications of user inputs in response to prompts output by UI module 220 via UI component 212.

In some examples, biometric module 222 may execute locally (e.g., at processors 240) to provide functions associated with verifying received biometric inputs and the order of the received biometric inputs, as well as granting or denying access to the user to provide further commands to computing device 210. In some examples, biometric module 222 may act as an interface to a remote service accessible to computing device 210. For example, biometric module 222 may be an interface or application programming interface (API) to a remote server that analyzes received biometric inputs and the order of the received biometric inputs, and grants or denies access to the user to provide further commands to computing device 210.

One or more storage components 248 within computing device 210 may store information for processing during operation of computing device 210 (e.g., computing device 210 may store data accessed by modules 220 and 222, and data store 226 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222 and data store 226. Storage components 248 may include a memory configured to store data or other information associated with modules 220 and 222, and data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras) one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UI component 212 of computing device 210 may be similar to UI component 112 of computing device 110 and includes display component 202 and presence-sensitive input component 204. Display component 202 may be a screen, such as any of the displays or systems described with respect to output components 246, at which information (e.g., a visual indication) is displayed by UI component 212 while presence-sensitive input component 204 may detect an object at and/or near display component 202.

While illustrated as an internal component of computing device 210, UI component 212 may also represent an external component that shares a data path with computing device 210 for transmitting and/or receiving input and output. For instance, in one example, UI component 212 represents a built-in component of computing device 210 located within and physically connected to the external packaging of computing device 210 (e.g., a screen on a mobile phone). In another example, UI component 212 represents an external component of computing device 210 located outside and physically separated from the packaging or housing of computing device 210 (e.g., a monitor, a projector, etc. that shares a wired and/or wireless data path with computing device 210).

UI component 212 of computing device 210 may detect two-dimensional and/or three-dimensional gestures as input from a user of computing device 210. For instance, a sensor of UI component 212 may detect a user's movement (e.g., moving a hand, an arm, a pen, a stylus, a tactile object, etc.) within a threshold distance of the sensor of UI component 212. UI component 212 may determine a two or three-dimensional vector representation of the movement and correlate the vector representation to a gesture input (e.g., a hand-wave, a pinch, a clap, a pen stroke, etc.) that has multiple dimensions. In other words, UI component 212 can detect a multi-dimension gesture without requiring the user to gesture at or near a screen or surface at which UI component 212 outputs information for display. Instead, UI component 212 can detect a multi-dimensional gesture performed at or near a sensor which may or may not be located near the screen or surface at which UI component 212 outputs information for display.

In accordance with one or more techniques of this disclosure, UI module 220 receives, from a user, an indication of a first biometric input at sensors 252. The first biometric input may be any of a fingerprint input, a voice input, a facial recognition input, and a retina input.

Biometric module 222 determines that the first biometric input matches a first predetermined biometric input of a verification sequence in rules 226. After receiving the first biometric input, UI module 220 provides a first prompt to the user via UI component 212. The first prompt includes a first request for at least one of a next biometric input user selection and a complete verification sequence user selection. In some examples, the first prompt is a visual prompt provided UI component 212 of computing device 210, while the prompt may be an audible prompt in other examples.

If UI module 22 receives the complete verification sequence user selection at this point, or at any point before when the biometric verification sequence is incomplete, has received too many inputs, or the order was completed incorrectly, biometric module 222 may prohibit enablement of computing device 210 to receive a user command. In other words, rather than simply verifying a biometric signature, biometric module 222 also verifies the order in which the biometric inputs are received as part of the overall verification process. Should biometric module 222 verify each of the biometric inputs as matching the predetermined biometric signature but also determine that the biometric inputs were entered in an order different than the predetermined verification sequence, biometric module 222 may prohibit enablement of computing device 210 to receive a user command.

UI module 220 may receive, from the user, the next biometric input user selection in response to the first prompt. UI module 220 may receive, from the user, an indication of a second biometric input at sensors 252. The second biometric input may be any of a fingerprint input, a voice input, a facial recognition input, and a retina input, regardless of what the first biometric input consisted of. For instance, the first and second biometric inputs may both be fingerprint inputs, the first biometric input may be a fingerprint input and the second biometric input may be one of a voice input, a facial recognition input, or a retina input, or the first biometric input may be a retina input and the second biometric input may be a voice input. The first and second biometric inputs may be any combination of biometric inputs described herein.

Biometric module 222 may determine that the second biometric input matches a second predetermined biometric input of a verification sequence. After receiving the second biometric input, UI module 220 provides a second prompt to the user via UI component 212. The second prompt includes a second request for at least one of the next biometric input user selection and the complete verification sequence user selection. In some examples, the second prompt is a visual prompt provided UI component 212 of computing device 210, while the second prompt may be an audible prompt in other examples.

UI module 220 receives, from the user, the complete verification sequence user selection in response to the second prompt. After receiving the complete verification sequence user selection, and upon biometric module 222 determining that at least the first biometric input matches the first predetermined biometric input of the verification sequence, the second biometric input matches the second predetermined biometric input of the verification sequence, and an order in which the first biometric input and the second biometric input is received matches a predetermined biometric input order for the first biometric input and the second biometric input required by the verification sequence, biometric module 222 enables computing device 210 to receive a user command.

In some instances, the predetermined biometric input order required by the verification sequence includes the first biometric input being received before the second biometric input. In such instances, when UI module 220 receives the second biometric input before the first biometric input, biometric module 222 may prohibit enablement of computing device 210 to receive a user command.

In some examples, in enabling computing device 210 to receive the user command, biometric module 222 may unlock computing device 210. For instance, computing device 210 may be a control panel for a premise security system. When the control panel is set to an armed mode prior to UI module 220 receiving each of the first biometric input and the second biometric input, biometric module 222, upon verifying the biometric inputs and the order of the biometric inputs, may either set the control panel to an unarmed mode or may unlock the control panel such that the user may set the control panel to the unarmed mode.

In some instances, biometric module 222 may require that the biometric verification process is repeated to provide an additional layer of security and to lower the chances of a false positive biometric authentication. For instance, after UI module 220 receives the complete verification sequence user selection, and upon biometric module 222 determining that at least the first biometric input matches the first predetermined biometric input of the verification sequence, the second biometric input matches the second predetermined biometric input of the verification sequence, and the order in which the first biometric input and the second biometric input is received matches the predetermined biometric input order, UI module 220 may provide a verification prompt to the user. The verification prompt may include a request to repeat the first biometric input and the second biometric input.

UI module 220 and biometric module 222 may then repeat the process, receiving first and second repeat biometric inputs and determining the validity of the repeat biometric inputs. After UI module 220 receives the repeat first biometric input and the repeat second biometric input, and upon biometric module 222 determining that at least the repeat first biometric input matches the first predetermined biometric input of the verification sequence, the repeat second biometric input matches the second predetermined biometric input of the verification sequence, and an order in which the repeat first biometric input and the repeat second biometric input is received matches the predetermined biometric input order for the first biometric input and the second biometric input required by the verification sequence, biometric module 222 may then enable the computing device to receive the user command.

While the above example is shown with only two biometric inputs, it should be understood that the verification sequence can include more biometric inputs. For instance, the biometric verification sequence may include three, four, five, or any number of predetermined biometric inputs. In such instances, UI module 220 may receive the next biometric input user selection multiple times, UI module 220 may receive any number of indications of biometric inputs from the user, and biometric module 222 may compare every received biometric input with each predetermined biometric input in the predetermined biometric verification sequence. Biometric module 222 may also verify that the order of the any number of biometric inputs was the correct order for the predetermined biometric verification sequence, thereby creating an open-ended and indeterminate-length passcode of biometric information. This even further enhances the security of the system, as an intruder must have the fraudulent biometric information to satisfy the system but must also input the biometric inputs in the correct order and must input the correct amount of biometric inputs.

Figure 3:
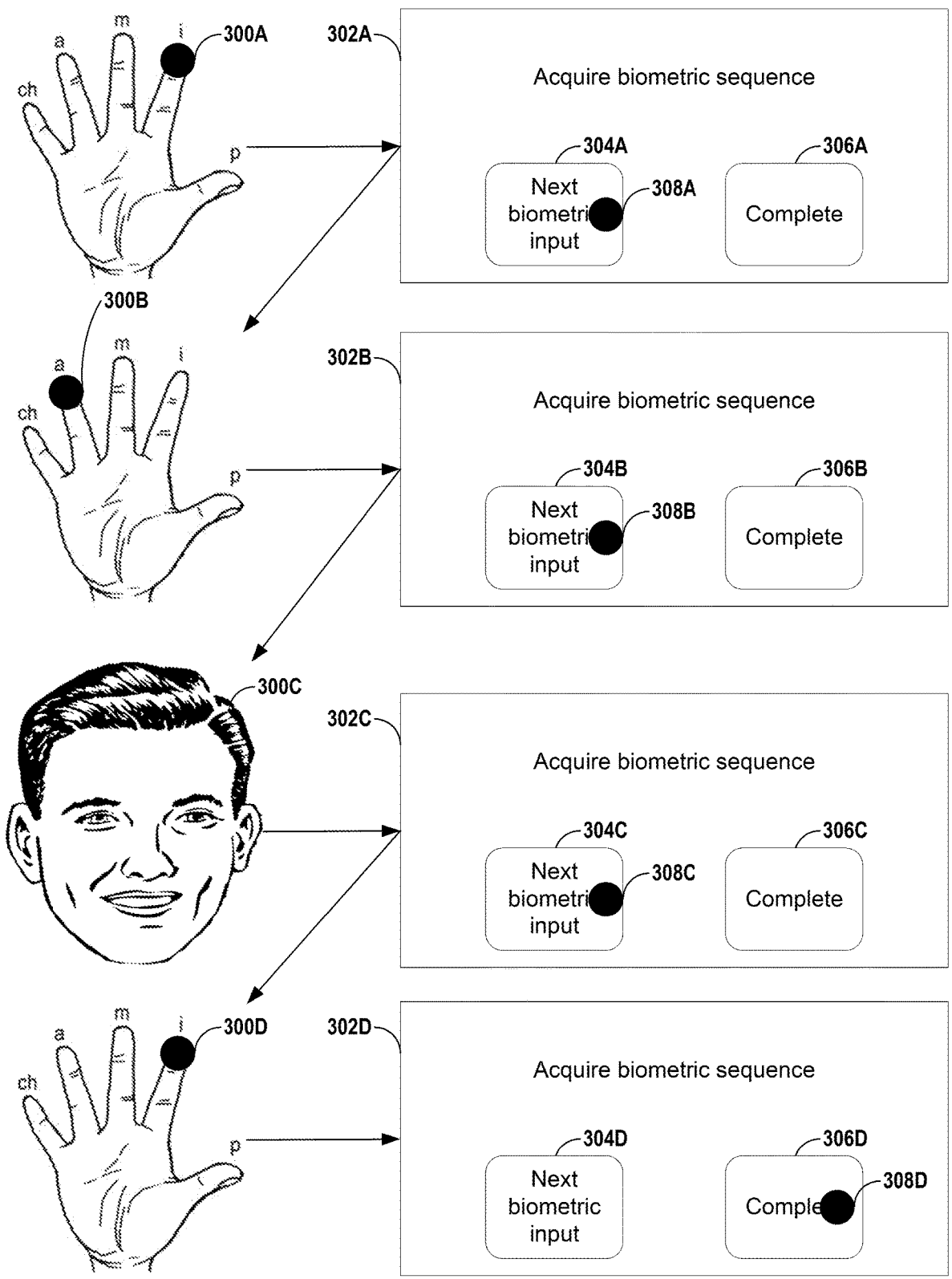
FIG. 3 is a conceptual diagram illustrating a sequence of biometric inputs, in accordance with one or more techniques of this disclosure.

FIG. 3 is a conceptual diagram illustrating a sequence of biometric inputs, in accordance with one or more techniques of this disclosure. For the purposes of this disclosure, any of inputs 300A-300D can be considered to have been received at one of sensors 152 of FIG. 1 or sensors 252 of FIG. 2. Furthermore, any of prompts 302A-302D can be considered to have been output by one of computing device 110 or computing device 210 for display on, or audibly by, UI component 112 or UI component 212, respectively. Inputs 300A-300D and prompts 302A-302D are mere examples of a potential sequence operating in accordance with the techniques described herein, and it should be understood that other sequences, other prompt configurations, and other biometric inputs could be used for similar verification sequences in accordance with the techniques described herein.

As shown in FIG. 3, a user may first provide input 300A into the system, which corresponds to a fingerprint of pointer finger "i" of the user's right hand. In response to receiving input 300A, the computing device may output prompt 302A, requesting either next biometric input user selection 304A or complete verification sequence user selection 306A. The user may wish to continue providing biometric signatures to complete the predetermined sequence, so the user may input selection 308A of next biometric input user selection 304A.

After selecting next biometric input user selection 304A with selection 308A, the user may provide input 300B into the system, which corresponds to a fingerprint of ring finger "a" of the user's right hand. In response to receiving input 300B, the computing device may output prompt 302B, requesting either next biometric input user selection 304B or complete verification sequence user selection 306B. The user may wish to continue providing biometric signatures to complete the predetermined sequence, so the user may input selection 308B of next biometric input user selection 304B.

After selecting next biometric input user selection 304B with selection 308B, the user may provide input 300C into the system, which corresponds to a facial recognition scan of the user's face. In response to receiving input 300C, the computing device may output prompt 302C, requesting either next biometric input user selection 304C or complete verification sequence user selection 306C. The user may wish to continue providing biometric signatures to complete the predetermined sequence, so the user may input selection 308C of next biometric input user selection 304C.

After selecting next biometric input user selection 304C with selection 308C, the user may provide input 300D into the system, which corresponds to a fingerprint of pointer finger "i" of the user's right hand (similar to input 300A). In this way, the biometric verification sequence described herein may repeat biometric inputs during the verification process. In response to receiving input 300D, the computing device may output prompt 302D, requesting either next biometric input user selection 304D or complete verification sequence user selection 306D. The user may believe that they have completed the proper predetermined sequence, so the user may input selection 308D of complete verification sequence user selection 306D. The computing device may analyze each of inputs 300A-300D to verify that the inputs match the biometric signature stored in a rules data store for the particular user, as well as verify the order in which inputs 300A-300D were input to verify that the order matches the predetermined biometric verification sequence. Should inputs 300A-300D match the biometric signatures and should the order of inputs 300A-300D match the biometric verification sequence, the computing device may grant access for the user to input commands into the computing device or may complete a previously input command.

Figure 4:
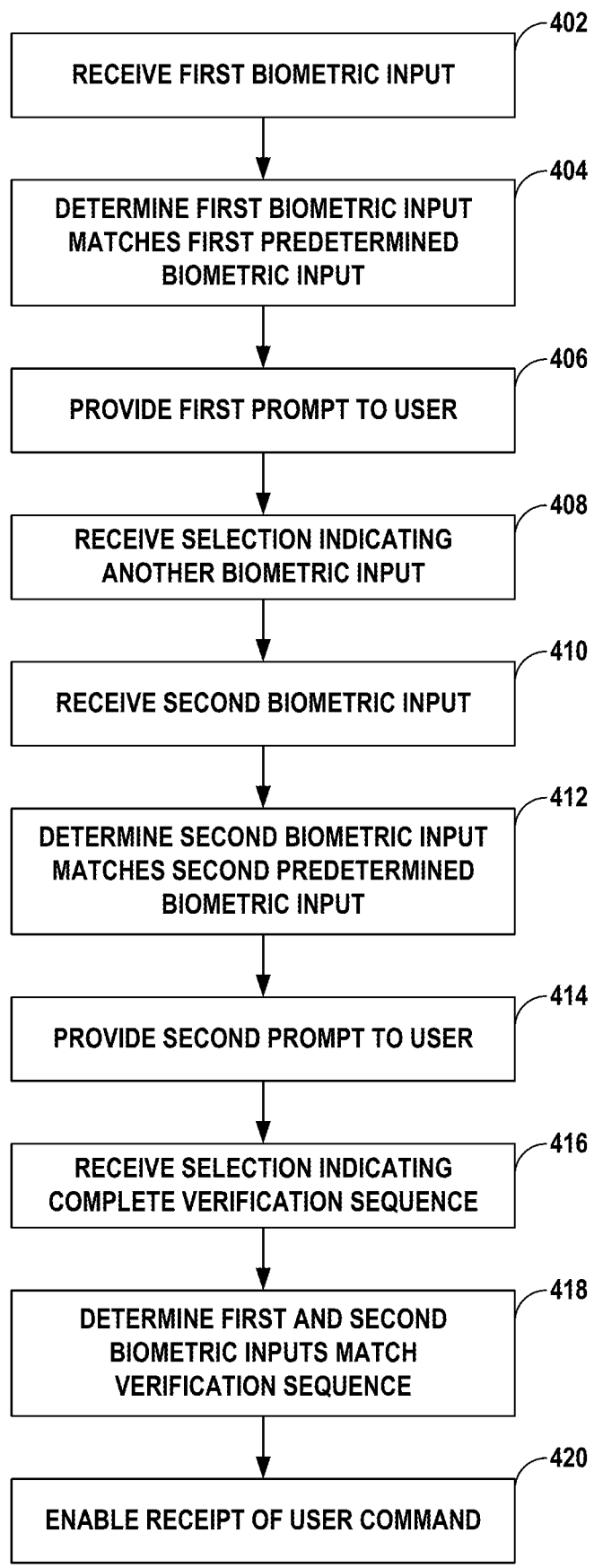
FIG. 4 is a flowchart illustrating an example biometric authorization technique in accordance with the techniques described herein.

FIG. 4 is a flowchart illustrating an example biometric authorization technique in accordance with the techniques described herein. The techniques of FIG. 4 may be performed by one or more processors of a computing device, such as system 100 of FIG. 1 and/or computing device 210 illustrated in FIG. 2. For purposes of illustration only, the techniques of FIG. 4 are described within the context of computing device 210 of FIG. 2, although computing devices having configurations different than that of computing device 210 may perform the techniques of FIG. 4.

In accordance with one or more techniques of this disclosure, UI module 220 receives, from a user, a first biometric input at sensors 252 (402). Biometric module 222 determines that the first biometric input matches a first predetermined biometric input of a verification sequence in rules 226 (404). After receiving the first biometric input, UI module 220 provides a first prompt to the user via UI component 212 (406). The first prompt includes a first request for at least one of a next biometric input user selection and a complete verification sequence user selection.

UI module 220 receives, from the user, the next biometric input user selection in response to the first prompt (408). UI module 220 receives, from the user, a second biometric input at sensors 252 (410). Biometric module 222 determines that the second biometric input matches a second predetermined biometric input of a verification sequence (412). After receiving the second biometric input, UI module 220 provides a second prompt to the user via UI component 212 (414). The second prompt includes a second request for at least one of the next biometric input user selection and the complete verification sequence user selection.

UI module 220 receives, from the user, the complete verification sequence user selection in response to the second prompt (416). After receiving the complete verification sequence user selection, and upon biometric module 222 determining that at least the first biometric input matches the first predetermined biometric input of the verification sequence, the second biometric input matches the second predetermined biometric input of the verification sequence, and an order in which the first biometric input and the second biometric input is received matches a predetermined biometric input order for the first biometric input and the second biometric input required by the verification sequence (418), biometric module 222 enables computing device 210 to receive a user command (420).

Figure 5:
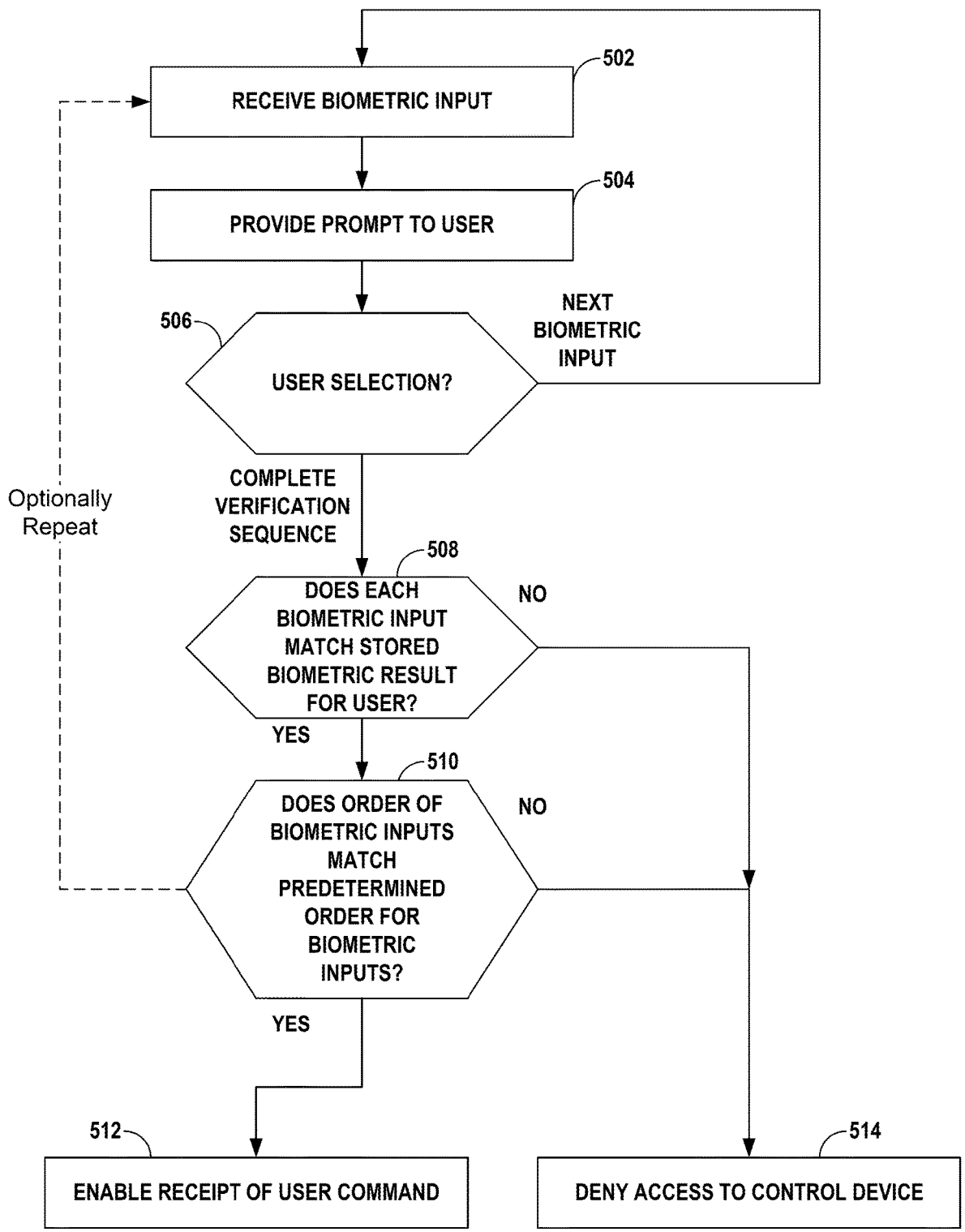
FIG. 5 is a flow chart illustrating an example biometric authorization technique in accordance with the techniques described herein.

FIG. 5 is a flow chart illustrating an example biometric authorization technique in accordance with the techniques described herein. The techniques of FIG. 5 may be performed by one or more processors of a computing device, such as system 100 of FIG. 1 and/or computing device 210 illustrated in FIG. 2. For purposes of illustration only, the techniques of FIG. 5 are described within the context of computing device 210 of FIG. 2, although computing devices having configurations different than that of computing device 210 may perform the techniques of FIG. 5.

In accordance with one or more techniques of this disclosure, UI module 220 may receive an indication of user input that includes a biometric signature at sensors 252 (502). UI module 220 then provides a prompt to the user via UI component 212 (504), the prompt including a request for at least one of a next biometric input user selection and a complete verification sequence user selection.

UI module 220 receives an indication of a second user input indicating a user selection in response to the prompt (506). If UI module 220 determines that the indication of second user input indicates a user selection of a next biometric input user selection ("NEXT BIOMETRIC INPUT" branch of 506), UI module 220 receives another indication of user input that includes a biometric signature at sensors (502) and provides the prompt to the user via UI component 212 (504) again. UI module 220 repeats this process until UI module 220 determines that the indication of user input indicates a selection of a complete verification sequence user selection ("COMPLETE VERIFICATION SEQUENCE" branch of 506).

In response to receiving the complete verification sequence user selection, biometric module 222 determines whether each received biometric signature matches a stored biometric result for the particular user to first verify that each user input is valid (508). If biometric module 222 determines that one or more biometric signatures do not match a stored biometric result for the particular user ("NO" branch of 508), biometric module 222 denies the user access to computing device 210 (514). If biometric module 222 determines that every biometric signature does match a stored biometric result for the particular user ("YES" branch of 508), biometric module 222 determines whether the order of biometric inputs matches the predetermined order for the biometric inputs (510). If biometric module 222 determines that the order of biometric inputs does not match the predetermined order for biometric inputs ("NO" branch of 510), biometric module 222 denies the user access to computing device 210 (514). Conversely, if biometric module 222 determines that the order of biometric inputs does match the predetermined order for biometric inputs ("YES" branch of 510), biometric module 222 grants user access to computing device 210 and enables the receipt of a user command (512).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising the steps of:
    receiving, from a user, a first biometric input at a computing device;
    determining that the first biometric input matches a first predetermined biometric input of a verification sequence;
    after receiving the first biometric input at the computing device, providing a first prompt to the user, the first prompt including a first request for at least one of a next biometric input user selection and a complete verification sequence user selection;
    receiving, from the user, the next biometric input user selection in response to the first prompt;
    receiving, from the user, a second biometric input at the computing device;
    determining that the second biometric input matches a second predetermined biometric input of a verification sequence;
    after receiving the second biometric input at the computing device, providing a second prompt to the user, the second prompt including a second request for at least one of the next biometric input user selection and the complete verification sequence user selection;
    receiving, from the user, the complete verification sequence user selection in response to the second prompt; and
    after i) receiving the complete verification sequence user selection, and ii) upon determining that at least the first biometric input matches the first predetermined biometric input of the verification sequence, the second biometric input matches the second predetermined biometric input of the verification sequence, and an order in which the first biometric input and the second biometric input is received matches a predetermined biometric input order for the first biometric input and the second biometric input required by the verification sequence, enabling the computing device to receive a user command.

2. The method of claim 1, wherein the predetermined biometric input order required by the verification sequence includes the first biometric input being received before the second biometric input.

3. The method of claim 2, wherein, when the second biometric input is received before the first biometric input, prohibiting enablement of the computing device to receive a user command.

4. The method of claim 1, wherein the first biometric input comprises a first fingerprint input and the second biometric input comprises a second fingerprint input.

5. The method of claim 1, wherein each of the first biometric input and the second biometric input is selected from the group consisting of: a fingerprint input, a voice input, a facial recognition input, and a retina input.

6. The method of claim 1, wherein one of the first biometric input and the second biometric input comprises a fingerprint input and the other of the first biometric input and the second biometric input is selected from the group consisting of: a voice input, a facial recognition input, and a retina input.

7. The method of claim 1, wherein enabling the computing device to receive the user command comprises unlocking the computing device.

8. The method of claim 7, wherein the computing device is a control panel for a premise security system, and wherein the control panel is set to an armed mode prior to receiving each of the first biometric input and the second biometric input.

9. The method of claim 1, further comprising:
    after i) receiving the complete verification sequence user selection, and ii) upon determining that at least the first biometric input matches the first predetermined biometric input of the verification sequence, the second biometric input matches the second predetermined biometric input of the verification sequence, and the order in which the first biometric input and the second biometric input is received matches the predetermined biometric input order, providing a verification prompt to the user, the verification prompt including a request to repeat the first biometric input and the second biometric input; and
    after i) receiving a repeat first biometric input and a repeat second biometric input, and ii) upon determining that at least the repeat first biometric input matches the first predetermined biometric input of the verification sequence, the repeat second biometric input matches the second predetermined biometric input of the verification sequence, and an order in which the repeat first biometric input and the repeat second biometric input is received matches the predetermined biometric input order for the first biometric input and the second biometric input required by the verification sequence, enabling the computing device to receive the user command.

10. The method of claim 1, wherein, in response to receiving the complete verification sequence user selection before receiving the second biometric input, prohibiting enablement of the computing device to receive a user command.

11. The method of claim 1, wherein the first prompt is a visual prompt provided at the computing device, and wherein the second prompt is a visual prompt provided at the computing device.

12. A non-transitory computer-readable storage medium comprising computer-executable instructions that, when executed by one or more processors of a computing device, cause the one or more processors to:
receive, by one or more processors of the computing device, a first biometric input;
determine, by the one or more processors of the computing device, that the first biometric input matches a first predetermined biometric input of a verification sequence;
after receiving the first biometric input, provide, by the one or more processors of the computing device, a first prompt, the first prompt including a first request for at least one of a next biometric input user selection and a complete verification sequence user selection;
receive, by the one or more processors of the computing device, the next biometric input user selection in response to the first prompt;
receive, by the one or more processors of the computing device, a second biometric input;
determine, by the one or more processors of the computing device, that the second biometric input matches a second predetermined biometric input of a verification sequence;
after receiving the second biometric input, provide, by the one or more processors of the computing device, a second prompt to the user, the second prompt including a second request for at least one of the next biometric input user selection and the complete verification sequence user selection;
receive, by the one or more processors of the computing device, the complete verification sequence user selection in response to the second prompt; and
after i) receiving, by the one or more processors of the computing device, the complete verification sequence user selection, and ii) upon determining, by the one or more processors of the computing device, that at least the first biometric input matches the first predetermined biometric input of the verification sequence, the second biometric input matches the second predetermined biometric input of the verification sequence, and an order in which the first biometric input and the second biometric input is received matches a predetermined biometric input order for the first biometric input and the second biometric input required by the verification sequence, enable, by the one or more processors of the computing device, receipt of a user command.

13. The non-transitory computer-readable storage medium of claim 12, wherein the predetermined biometric input order required by the verification sequence includes the first biometric input being received before the second biometric input.

14. The non-transitory computer-readable storage medium of claim 13, wherein, when the second biometric input is received before the first biometric input, prohibit, by the one or more processor of the computing device, receipt of a user command.

15. The non-transitory computer-readable storage medium of claim 12, wherein each of the first biometric input and the second biometric input is selected from the group consisting of: a fingerprint input, a voice input, a facial recognition input, and a retina input.

16. The non-transitory computer-readable storage medium of claim 12, wherein one of the first biometric input and the second biometric input comprises a fingerprint input and the other of the first biometric input and the second biometric input is selected from the group consisting of: a voice input, a facial recognition input, and a retina input.

17. The non-transitory computer-readable storage medium of claim 12, wherein enabling, by the one or more processors of the computing device, receipt of the user command comprises unlocking the computing device.

18. The non-transitory computer-readable storage medium of claim 17, wherein the computing device is a control panel for a premise security system, and wherein the control panel is set to an armed mode prior to receiving each of the first biometric input and the second biometric input.

19. The non-transitory computer-readable storage medium of claim 12, wherein executing the computer-executable instructions by the one or more processors of the computing device further causes the one or more processors to:
after i) receiving, by the one or more processors of the computing device, the complete verification sequence user selection, and ii) upon determining, by the one or more processors of the computing device, that at least the first biometric input matches the first predetermined biometric input of the verification sequence, the second biometric input matches the second predetermined biometric input of the verification sequence, and the order in which the first biometric input and the second biometric input is received matches the predetermined biometric input order, provide, by the one or more processors of the computing device, a verification prompt to the user, the verification prompt including a request to repeat the first biometric input and the second biometric input; and
after i) receiving, by the one or more processors of the computing device, a repeat first biometric input and a repeat second biometric input, and ii) upon determining, by the one or more processors of the computing device, that at least the repeat first biometric input matches the first predetermined biometric input of the verification sequence, the repeat second biometric input matches the second predetermined biometric input of the verification sequence, and an order in which the repeat first biometric input and the repeat second biometric input is received matches the predetermined biometric input order for the first biometric input and the second biometric input required by the verification sequence, enable, by the one or more processors of the computing device, receipt of the user command.

20. The non-transitory computer-readable storage medium of claim 12, wherein, in response to receiving, by the one or more processors of the computing device, the complete verification sequence user selection before receiving the second biometric input, prohibit, by the one or more processors of the computing device, receipt of the user command.

* * * * *